(12) United States Patent
Gurwicz et al.

(10) Patent No.: US 6,256,209 B1
(45) Date of Patent: Jul. 3, 2001

(54) AC TO DC CONVERSION ARRANGEMENT

(75) Inventors: David Gurwicz, Gateshead Tyne & Wear; Kevin Thompson, Southshields, both of (GB)

(73) Assignee: Nada Electronics Limited (GB)

( * ) Notice: Subject to any disclaimer, the term of this patent is extended or adjusted under 35 U.S.C. 154(b) by 0 days.

(21) Appl. No.: 09/530,305

(22) PCT Filed: Oct. 28, 1998

(86) PCT No.: PCT/GB98/03210

§ 371 Date: Apr. 27, 2000

§ 102(e) Date: Apr. 27, 2000

(87) PCT Pub. No.: WO99/22436

PCT Pub. Date: May 6, 1999

(30) Foreign Application Priority Data

Oct. 28, 1997 (GB) .................................................. 9722780

(51) Int. Cl.[7] .............................. H02M 3/335; H02M 3/24
(52) U.S. Cl. ................................................. 363/17; 363/98
(58) Field of Search ................................ 363/16, 17, 97, 363/98, 131, 132

(56) References Cited

U.S. PATENT DOCUMENTS

| 4,591,963 | * | 5/1986 | Retotar ...................................... 363/17 |
| 5,081,570 | * | 1/1992 | Chibani et al. ......................... 363/17 |
| 5,355,294 | * | 10/1994 | De Doncker et al. .................. 363/17 |
| 6,115,267 | * | 9/2000 | Herbert ................................. 363/125 |

FOREIGN PATENT DOCUMENTS

| 2 226 197 | 12/1973 | (DE) . |
| 42 14 918 A1 | 11/1993 | (DE) . |
| 44 26 018 A1 | 2/1996 | (DE) . |
| 196 32 023 A1 | 2/1998 | (DE) . |
| 56-132766 | 8/1982 | (JP) . |
| 07184375 | 7/1995 | (JP) . |
| WO 96/19037 | 6/1996 | (WO) . |

OTHER PUBLICATIONS

Single–Stage Single–Phase Parallel Power Factor Correction Scheme, Yimin Jiang, et al., Virginia Power Electronics Center, The Bradley Department of Electrical Engineering Virginia Polytechnic Institute and State University, Blacksburg, VA, Jun. 20, 1994, pp. 1145–1151.

* cited by examiner

Primary Examiner—Matthew Nguyen
(74) Attorney, Agent, or Firm—Kirschstein, et al.

(57) ABSTRACT

An arrangement for converting an AC supply to a DC supply comprising an inverter circuit and a boost power factor correction stage. The inverter circuit comprises switchable components and utilizes a pulsed waveform indicative of power factor correction for causing some at least of the components repeatedly to adopt a condition permitting the boost power factor correction stage to draw current from the AC supply.

15 Claims, 4 Drawing Sheets

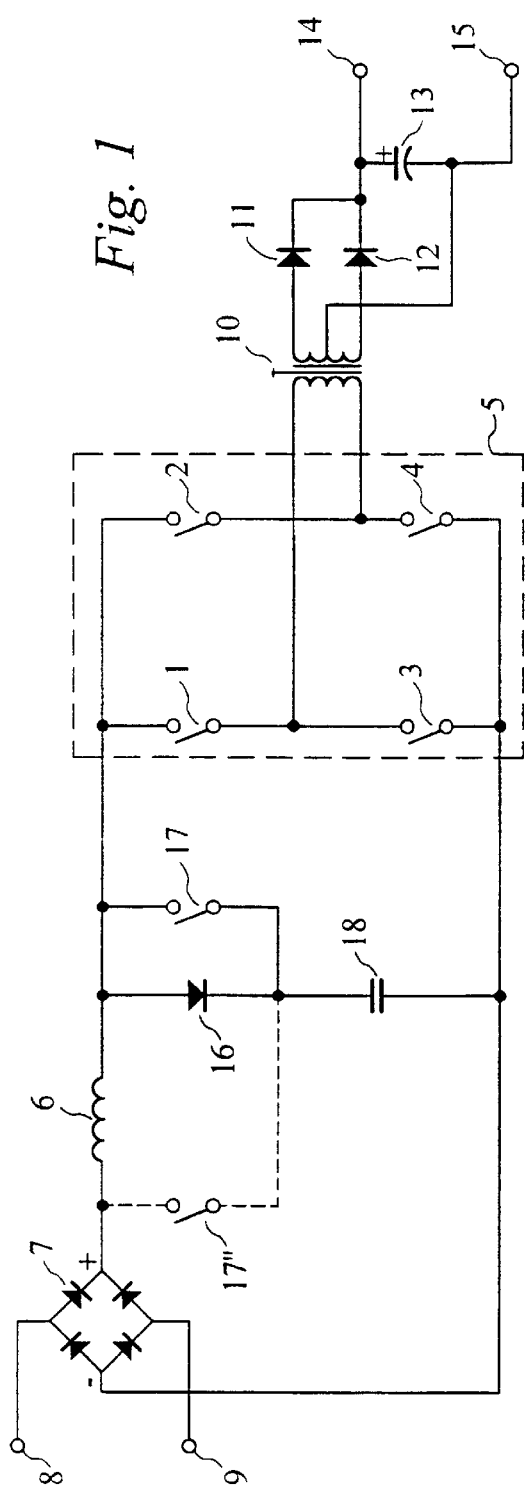
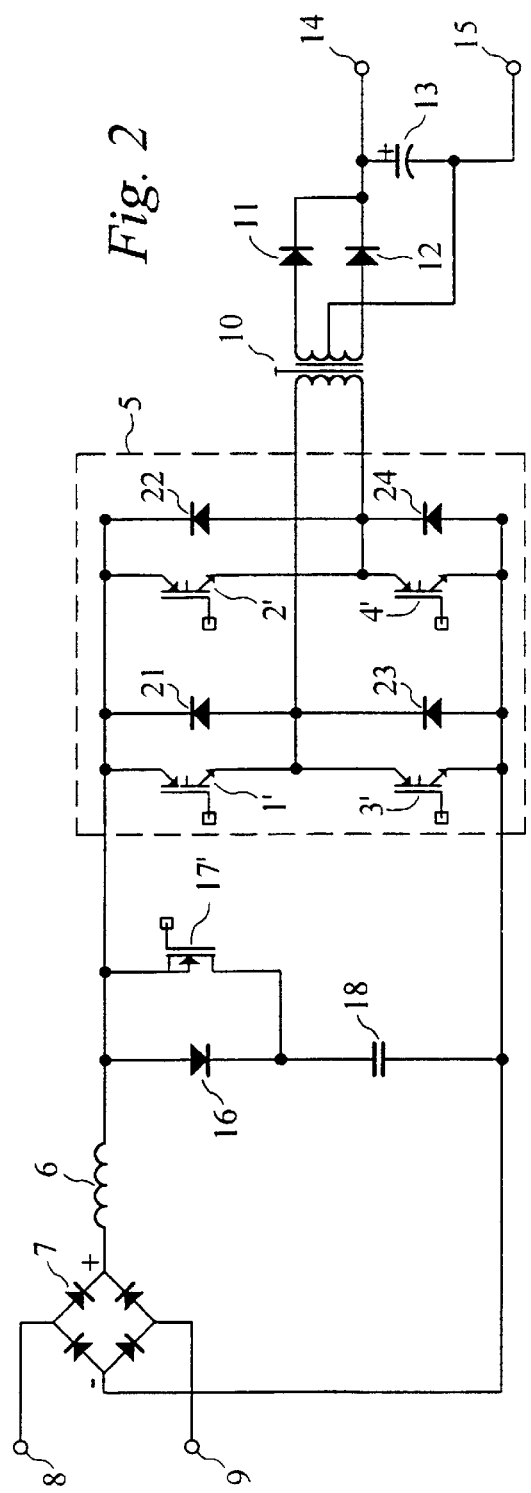

Inverter input and output waveforms

AC TO DC CONVERSION ARRANGEMENT

BACKGROUND OF THE INVENTION

This invention relates to AC to DC conversion arrangements, by which is meant arrangements capable of converting an input electrical supply of alternating waveform to an output electrical supply in which an alternating component is at least substantially reduced (hereafter a "DC supply"). Preferably the output supply is electrically isolated from the input supply. Preferably also the input supply comprises the AC mains supply and the output supply comprises a substantially steady unidirectional voltage.

A well known and simple form of mains-powered AC to DC converter capable of converting a substantially sinusoidal input supply to a DC output, generally at a lower voltage level but with electrical isolation between the input and output, comprises a step-down transformer and a half-wave rectifier. Such converters, however, exhibit poor power factors and are thus lossy and inefficient, although some improvement in efficiency can be achieved by full wave rectification of the transformer's output. In any event, however, since the transformer must operate at the relatively low mains frequency, it is bulky and expensive.

Further increases in efficiency, coupled with a reduction in transformer dimensions, can be achieved by interposing a full-wave rectifier and a high frequency inverter between the mains supply and the transformer, and it is also known that an inductor and inverter duty-cycle modulator circuitry can be used to control the level of the output voltage or current.

Today's EMC standards place high demands on, inter alia, the input power factors of mains-powered equipment, with the result that the input current waveform needs to track closely that of the input voltage. It is known to provide, for this purpose, so-called boost or buck mode pre-converter stages between the mains input rectifier and the transformer driver inverter to draw a controlled current from the supply, or to use flyback converter or buck converter topologies that combine output isolation with input power factor correction.

The foregoing arrangements exhibit various undesirable features, such as high cost, size and/or complexity of components and it is an object of at least the preferred embodiments of this invention to provide an AC to DC converter arrangement which is economical, efficient and compact. Preferably the arrangement also exhibits a controlled output, a near-unity power factor and can accommodate a wide range of input voltages.

SUMMARY OF THE INVENTION

According to the invention there is provided an arrangement for converting an AC supply to a DC supply comprising an inverter circuit and a boost power factor correction stage wherein said inverter circuit comprises switchable components and means for utilizing a pulsed waveform indicative of power factor correction for causing some at least of said components repeatedly to adopt a condition permitting said boost power factor correction stage to draw current from said AC supply characterized in that the switchable components are semiconductor devices connected to form a full bridge inverter, a first series connected pair of said devices being caused to conduct simultaneously for periods determined by the duration of alternate pulses of said waveform, a second pair of series connected said devices being caused to conduct simultaneously for periods determined by the duration of the intervening alternate pulses of said waveform, one device of each of said pair remaining conducting whilst the other pair of devices is conducting.

Such simultaneous conduction repeatedly short-circuits the inverter's input.

It is preferred that the semiconductor devices comprise MOSFET or IGBT devices.

The boost power factor correction stage preferably comprises an inductor which is repeatedly charged by current drawn from said AC source each time the inverter's input is short-circuited.

Each device of each pair may be individually switchable between substantially conductive and non-conductive conditions.

Preferably the other device of each of said series-connected pairs is caused to assume conductive or non-conductive conditions in dependence upon the level of a respective switching waveform applied thereto, said switching waveforms being in anti-phase.

One device of each of said series-connected pairs may be caused to assume conductive or non-conductive conditions in dependence on the level of a respective switching waveform applied thereto, the switching waveform for each of said other devices comprising a composite waveform derived from said pulsed waveform indicative of power factor correction and the switching waveform applied to the first device of the other series-connected pair.

The switching waveform applied to said devices may be such as to cause both devices in one series-connected pair to assume their conductive conditions during alternate pulses of said pulsed waveform and to cause both devices in the other series-connected pair to assume their conductive conditions during the intervening pulses of said pulsed waveform.

The arrangement may comprise a transformer, said inverter circuit having input and output connections, said output connection being coupled to a primary winding of said transformer, and said boost power factor correction stage being coupled between said electrical input supply and the input connection of said inverter.

There may be a temporary energy storage means configured to limit transient voltages applied to the inverter circuit.

The temporary energy storage means may comprise a unidirectionally conductive device and a capacitor connected in series, said unidirectionally conductive device being shunted by an electronically operable switch.

The electronically operable switch may be actuated to shunt said unidirectionally conductive device substantially in antiphase with said pulsed waveform indicative of power factor correction.

The electronically operated switch may shunt the capacitor to discharge it into the boost stage.

The arrangement may be for connection to a three-phase supply, said boost power factor corrector stage comprising a plurality of inductors each for connection in series to a respective phase of the three-phase supply.

BRIEF DESCRIPTION OF THE DRAWINGS

In order that the invention may be clearly understood and readily carried into effect, one embodiment thereof will now be described with reference to the accompanying drawings, of which:

FIG. 1 shows in outline form an AC to DC converter circuit for use in an arrangement according to one example of the invention, FIG. 2 shows the circuit of FIG. 1 in more detail.

DETAILED DESCRIPTION OF THE PREFERRED EMBODIMENTS

Figure 3:
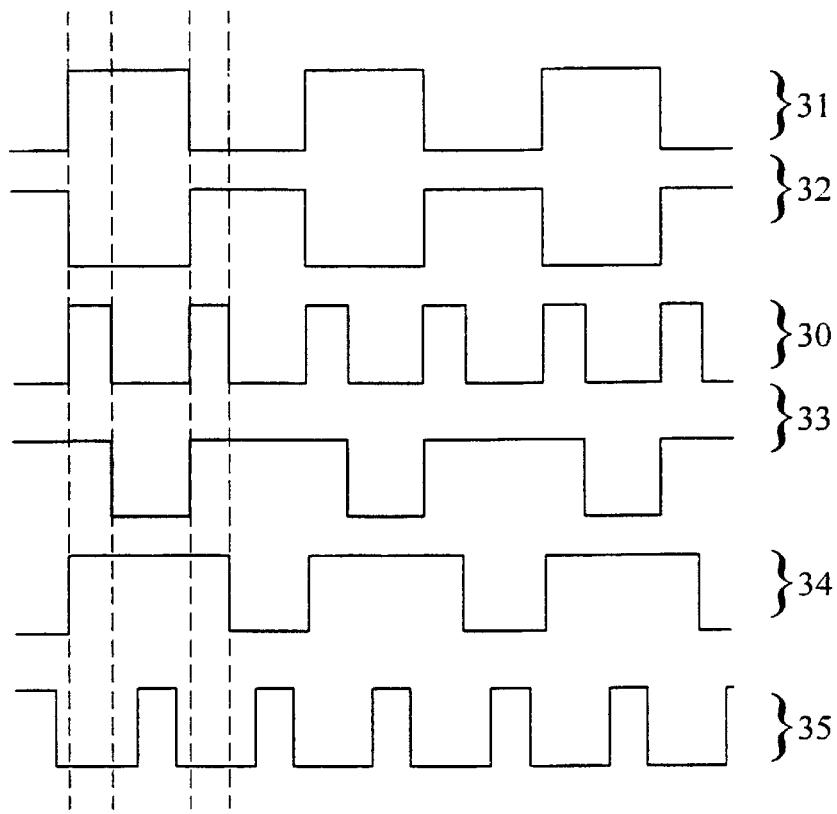
FIG. 3 shows operating waveforms applicable, in one example of an arrangement according to the invention, to certain components in the circuit of FIG. 2.

Referring now to FIG. 1, a fill bridge inverter comprising electronically switchable semiconductor devices 1 to 4 inclusive is shown within a dashed outline 5, and is driven via a boost inductor 6 and a bridge rectifier 7 from an AC supply applied to input terminals 8 and 9.

The output of the inverter 5 is applied to the primary winding of a transformer 10, and a pair of diodes 11 and 12 effect full-wave rectification of the output from the center-tapped secondary winding of transformer 10. The rectified output is fed to a smoothing capacitor 13 connected across the circuit's output terminals 14 and 15.

The remaining components, namely diode 16, switch 17 and capacitor 18, provide temporary energy storage to limit the transient voltages developed across the inverter's input terminals during the conversion process, due to the leakage reactance of the transformer 10. Unlike in prior art converters, the capacitor 18 does not provide energy storage for power factor correction, and is thus much smaller than in such converters.

Transformer 10 may be provided with an untapped secondary winding instead of the center-tapped component shown in FIG. 1, provided that the diodes 11 and 12 are replaced by a bridge rectifier network.

An important aspect of the arrangement is the use of the full bridge inverter 5 to provide both the alternating voltage drive for the high frequency (thus compact) transformer 10 and the required switching for a boost converter power factor correction stage. This is achieved in this example by combining conventional square-wave drive signals for the devices 1–4 with a power factor corrective (PFC) signal designed to create a controlled overlap in the conduction periods of series-connected pairs of the devices, (i.e 1,3 and 2,4), thereby effecting strategically timed short circuits across the input terminals of the inverter 5. The overlap periods are influenced by the PFC signal, which is generated by means of power factor control circuitry of known kind, and thus not shown in detail herein, so that the input current drawn through the boost inductor 6 from the supply is maintained at a level proportional to the instantaneous value of the applied supply voltage. The gain of the power factor control system is adjusted automatically to regulate the output voltage or current to the desired level.

In practice, the output voltage should be constrained to exceed a minimum value in order to maintain the inverter input voltage at a level which exceeds the peak supply voltage, so enabling boost conversion to take place. As a consequence, the minimum output voltage is determined by the peak supply voltage amplitude and the transformer turns ratio.

The output rectification for the input boost converter is provided by the rectifier diodes 11 and 12 (or the alternative bridge rectifier, if used) coupled to the secondary winding of the transformer 10. However, due to the inevitable stray inductances associated with the transformer 10, input current established in the boost inductor 6 cannot immediately be switched into the transformer's primary winding at the start of each inverter half-cycle. Thus, current established in the inductor 6 is diverted via diode 16 into capacitor 18 to prevent the development of large transient voltages across the primary winding of transformer 10 in order to protect the switching devices 1–4 of the inverter 5. After the impedance of the stray transformer inductances has been overcome, and current flow established in the primary winding of transformer 10, the capacitor 18 is discharged back into the inverter input via the switch 17.

To prevent the capacitor 18 from discharging through the devices 1–4 of the inverter 5, switch 17 is turned off (opened) prior to and for the duration of the inductor-recharge period of the boost conversion cycle.

The voltage developed across the capacitor 18 can conveniently be used as the input to an overvoltage protection mechanism (not shown) for the power factor controller circuitry. Boost conversion is discontinued in the event of a high voltage being developed at the input of inverter 5 due to excessive output voltage demand or sudden disconnection of the output load.

FIG. 2 shows how the circuit can be constructed using IGBT or MOSFET components as the devices 1–4 in FIG. 1; the choice being determined principally by cost and power-handling capability. In FIG. 2, components similar to those already described with reference to FIG. 1 are identified by the same reference numerals as were used in FIG. 1. In the case of the semiconductor devices 1–4 and 17, however, a prime has been added for FIG. 2.

As it is necessary to commutate currents flowing in the transformer's stray and magnetizing inductances it is necessary to connect diodes 21, 22, 23 and 24 in antiparallel across respective IGBT or bipolar devices employed in the full bridge inverter network. Further, to avoid possible overlaps between the conduction periods of switch 17' and the periods when the inverter 5 is short circuited via devices 1' and 3' or 2' and 4', it is necessary to use a fast-switching device such as a MOSFET for device 17'. Moreover, diode 16 must be a fast turn-on device to minimize commutation voltage spikes, as the parasitic anti-parallel diode within a MOSFET cannot usually be relied upon to give satisfactory performance.

Referring now to the waveforms shown in FIG. 3, these indicate the nature and timing of switching waveforms 31–35 applied to the devices 1'–4' and 17' in FIG. 2, and also a frequency modulated power factor corrective (PFC) waveform 30 derived for example from circuitry such as that described by J M Bourgeois of SGS-Thomson Microelectronics in an Application Note numbered AN510/0894 and entitled "Circuits for Power Factor Correction with regards to Mains Filtering". In particular, FIG. 5 of the aforesaid Application Note shows a single-chip L4981 A/B PFC controller available from SGS-Thomson. Similar controller devices are available from other manufacturers.

It can be seen that the waveforms 31 and 32, applied respectively to devices 1' and 2', are in anti-phase, and constitute switching square waves capable of turning the respective devices on and off. Waveforms 33 and 34, applied to devices 3' and 4' respectively, are derived respectively from the waveforms 32 and 31, but combined in each case with the PFC waveform 30. Thus the drive waveform 33 for device 3' obeys the rule (32 OR 30) whereas the drive waveform 34 for device 4' obeys the rule (31 OR 30). As can be seen from FIG. 3, this creates a situation whereby, during each alternate pulse of the PFC waveform 30, the devices 1' and 3' simultaneously conduct and, during the intervening alternate pulses of the waveform 30, the devices 2' and 4' simultaneously conduct. During each of these periods of simultaneous conduction, therefore, the input of the inverter 5 is short-circuited, allowing the boost inductor 6 to recharge.

It also can be seen that whilst the pair of devices 1, 3 are conducting, device 4 remains conducting but device 2 is switched off. When the pair of devices 2, 4 are conducting, device 3 remains conducting but device 1 is switched off.

Device 17' is driven by a waveform 35 designed to ensure that there can be no overlap between it and the PFC waveform 30. It is thus derived from the waveform 30 but with sufficient phase displacement relative thereto to ensure that there is no overlap and no coincidence of transitions between the waveforms 30 and 35. In a preferred example, waveform 35 is substantially in anti-phase with waveform 30.

Figure 4:
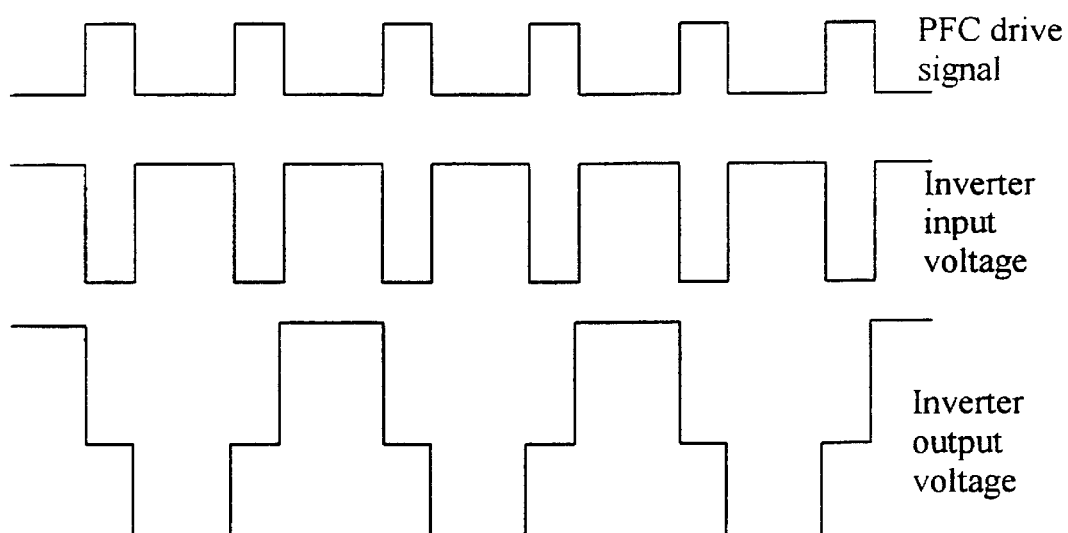
FIG. 4 shows the input and output waveforms of the inverter.

The inverter input and output waveforms are shown in FIG. 4 in relation to the PFC drive signal. The inverter waveform amplitude is approximately given by the product of the converter output voltage and the primary to secondary turns ratio of the transformer 10. The circuit arrangement described with reference to FIGS. 1, 2 and 3 is well suited to the requirements for battery charging at high power. In this application, an example of which is shown in FIG. 5, a relatively large AC component can be tolerated in the output current, minimizing the size of the smoothing capacitor 13.

Figure 5:
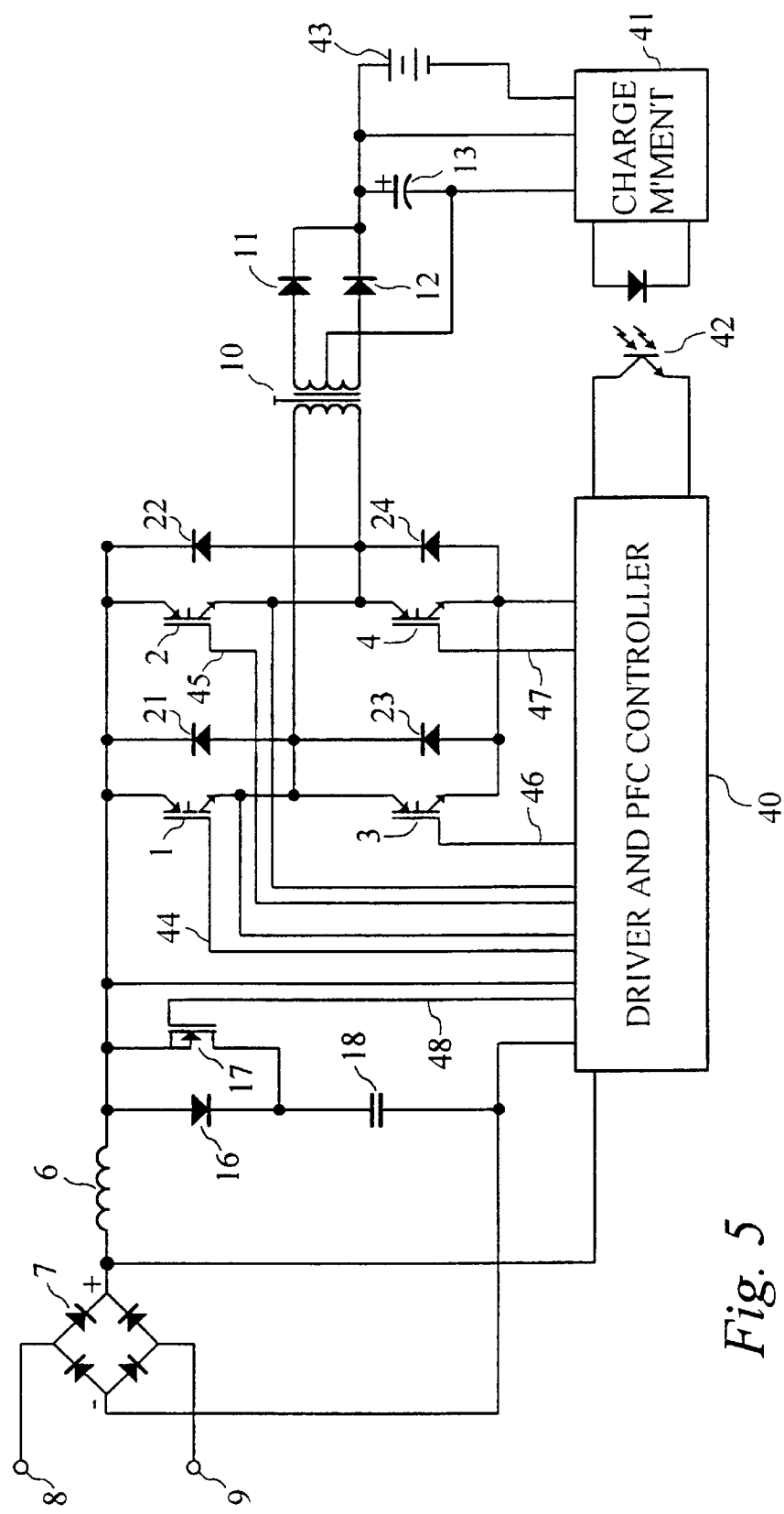
FIG. 5 shows a circuit of the kind shown in FIG. 2, and utilizing the drive waveforms shown in FIG. 3, incorporated into a conversion arrangement suitable for use as a battery charger.

In the arrangement of FIG. 5 components which have been described hitherto are identified by the same references as have been previously used for them, and they are not further described. The additional components shown in FIG. 5 comprise converter driver and PFC controller circuits 40, for example the L4981 A/B controller described in the aforementioned Application Note of J M Bourgeois, a battery charge management circuit 41 of known kind, linked to the circuits 40 through an opto isolator 42, and the battery itself, shown schematically at 43. It will be appreciated from the foregoing that the circuits 40 are adapted to provide the waveforms 31, 32, 33, 34 and 35 on lines 44, 45, 46, 47 and 48 respectively to switch the devices 1', 2', 3', 4' and 17' into conductive and non-conductive states as described previously.

The turns ratio for transformer 10 is such that the primary voltage required for power transfer at the minimum permitted battery voltage presented to the output exceeds the peak value of the maximum rated supply voltage. In this way, correct boost-mode conversion at the input is ensured, and hence power factor control effected, before power can be drawn from the supply.

Further, an electronic interlock is arranged to disable the inverter if the battery presented to the output terminals has a voltage too low for correct circuit operation. As a consequence, negligible inrush current is drawn from the supply, with the initial charge for the smoothing capacitor 13 being provided by the battery 43 under charge.

In a modification of the invention, the switch 17 of FIG. 1 (and its equivalents in other embodiments) may be connected to the positive rail upstream of the inductor 6 i.e., between the inductor 6 and the bridge rectifier 7 as shown in dotted lines in FIG. 1, instead of between the inductor and the inverter 5. In FIG. 1 as drawn in full lines, the switch 17 operates to discharge the capacitor 18 into the load via the leakage inductance of the transformer 10. With a good quality transformer this may result in a large current spike being developed to the load. By the modification, the capacitor 18 is discharged via switch 17" into the inductor 6 which being of considerable reactance absorbs the energy from the capacitor and at least reduces the transient current seen by the load.

Figure 6:
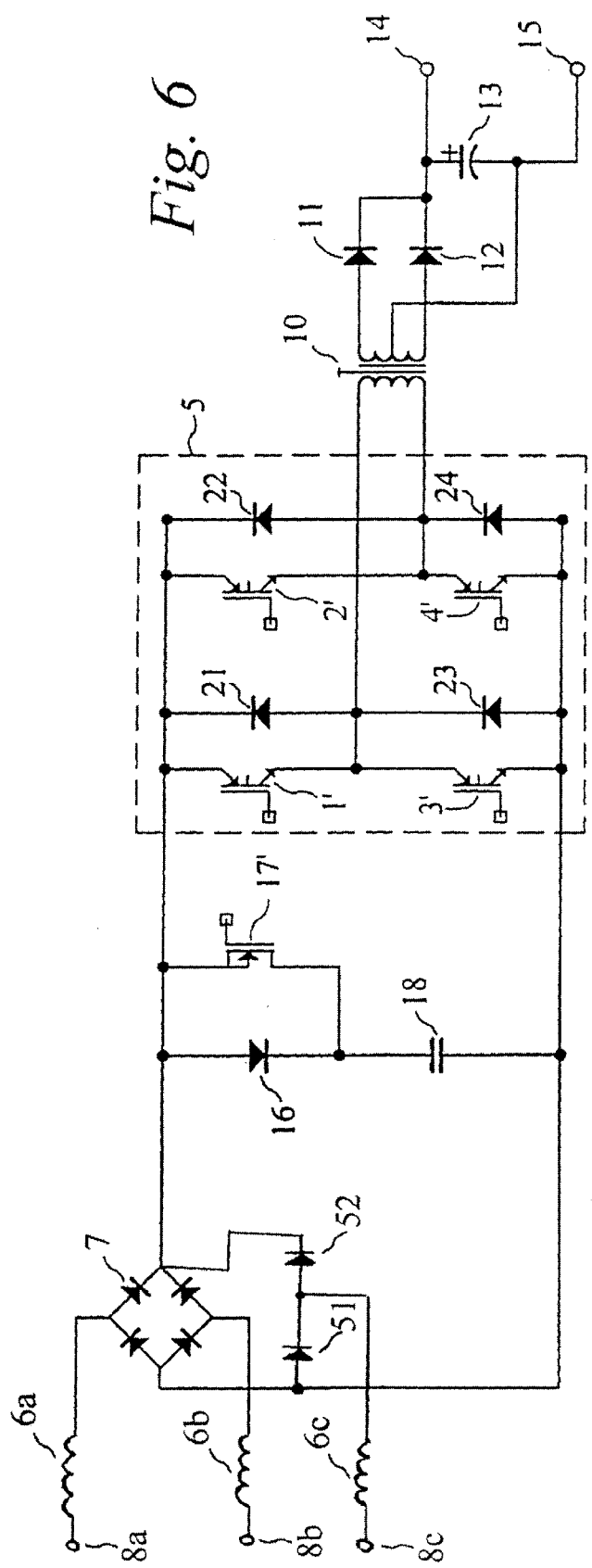
FIG. 6 shows an AC to DC converter circuit for use in an arrangement according to another example of the invention.

The invention has been described thus far in relation to its use with a single phase supply, but it will be appreciated that it is also suitable for use with a three-phase supply. An embodiment of such an AC to DC converter circuit is shown in FIG. 6. This circuit is similar to that shown in FIG. 2, and so components similar to those already described with reference to FIG. 2 are identified by the same reference numerals as used in FIG. 2.

The converter circuit of FIG. 6 differs from that of FIG. 2 in that the boost inductor 6 downstream of the bridge rectifier 7 has been replaced by three inductors 6a, 6b, 6c upstream of the rectifier 7, each inductor 6a, 6b, 6c being in series with input power line 8a, 8b, 8c for respective phases of the supply. The output of inductor 6c is connected to series-connected diodes 51, 52, the output of diode 52 being connected to the output of the rectifier 7.

Each inductor 6a, 6b, 6c acts as a boost PFC corrector, so that by maintaining a constant period of simultaneous conduction of the switching devices 1', 3' and 4' or 2', 3' and 4', i.e., the boost phase, the harmonic content of the supply current waveform can be reduced to the required level.

Each feature disclosed in this specification (which term includes the claims) and/or shown in the drawings may be incorporated in the invention independently of other disclosed and/or illustrated features.

What is claimed is:

1. An arrangement for converting an AC supply to a DC supply, comprising: an inverter circuit and a boost power factor correction stage, said inverter circuit including switchable components and means for utilizing a pulsed waveform indicative of power factor correction for causing some at least of said components repeatedly to adopt a condition permitting said boost power factor correction stage to draw electrical current from said AC supply, the switchable components being semiconductor devices connected to form a full-bridge inverter, a series-connected first pair of said devices and one device of a series-connected second pair of said devices being caused to conduct simultaneously for periods determined by a duration of alternate pulses of said pulsed waveform, the second pair of said devices and one device of said first pair of said devices being caused to conduct simultaneously for periods determined by a duration of intervening alternate pulses of said pulsed waveform.

2. An arrangement according to claim 1 wherein each device of each pair is individually switchable between substantially conductive and non-conductive conditions.

3. An arrangement according to claim 1 wherein the other device of each of said series-connected pairs is caused to assume conductive or non-conductive conditions in dependence upon the level of a respective switching waveform applied thereto, said switching waveforms being in anti-phase.

4. An arrangement according to claim 3 wherein said one device of each of said series-connected pairs is caused to assume conductive or non-conductive conditions in dependence on the level of a respective switching waveform applied thereto, the switching waveform for each of said other devices comprising a composite waveform derived from said pulsed waveform indicative of power factor correction and the switching waveform applied to said one device of the other series-connected pair.

5. An arrangement according to claim 3 wherein the switching waveforms applied to said devices are such as to cause both devices in one series-connected pair to assume their conductive conditions during alternate pulses of said pulsed waveform and to cause both devices in the other series-connected pair to assume their conductive conditions during the intervening pulses of said pulsed waveform.

6. An arrangement according to claim 1 comprising a transformer, said inverter circuit having input and output connections, said output connection being coupled to a primary winding of said transformer, and said boost power factor correction stage being coupled between said DC supply and the input connection of said inverter.

7. An arrangement according to claim 1 wherein at least some of said switchable components comprise IGBT semiconductor devices.

8. An arrangement according to claim 1 wherein at least one of said switchable components comprises a MOSFET semiconductor device.

9. An arrangement according to claim 1 including a temporary energy storage means configured to limit transient voltages applied to the inverter circuit.

10. An arrangement according to claim 9 wherein said temporary energy storage means comprises a unidirectionally conductive device and a capacitor connected in series, said unidirectionally conductive device being shunted by an electronically operable switch.

11. An arrangement according to claim 10 wherein said electronically operable switch is actuated to shunt said unidirectionally conductive device substantially in antiphase with said pulsed waveform indicative of power factor correction.

12. An arrangement according to claim 11 wherein the electronically operated switch shunts the capacitor to discharge it into the boost stage.

13. An arrangement according to claim 1 wherein said repeatedly adopted condition short-circuits an input of said inverter circuit.

14. An arrangement according to claim 2 wherein the boost power factor correction stage comprises an inductor which is repeatedly charged by current drawn from said AC supply each time an input of said inverter circuit is short-circuited.

15. An arrangement according to claim 1 for connection to a three-phase supply, said boost power factor corrector stage comprising a plurality of inductors each for connection in series to a respective phase of the three-phase supply.

* * * * *